US010310257B2

(12) United States Patent
Hirata et al.

(10) Patent No.: US 10,310,257 B2
(45) Date of Patent: Jun. 4, 2019

(54) HEAD-UP DISPLAY DEVICE

(71) Applicant: Maxell, Ltd., Kyoto (JP)

(72) Inventors: Koji Hirata, Ibaraki (JP); Masahiko Yatsu, Ibaraki (JP); Akio Misawa, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 183 days.

(21) Appl. No.: 15/307,121

(22) PCT Filed: May 9, 2014

(86) PCT No.: PCT/JP2014/062486
§ 371 (c)(1),
(2) Date: Oct. 27, 2016

(87) PCT Pub. No.: WO2015/170406
PCT Pub. Date: Nov. 12, 2015

(65) Prior Publication Data
US 2017/0045740 A1 Feb. 16, 2017

(51) Int. Cl.
*G09G 3/20* (2006.01)
*H04N 9/31* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ...... G09G 3/001–3/003; G09G 3/2003; G09G 3/22; G09G 3/34–3/3426;
(Continued)

(56) References Cited

U.S. PATENT DOCUMENTS

2006/0197716 A1 9/2006 Tanaka et al.
2006/0262283 A1 11/2006 Kurosaki
(Continued)

FOREIGN PATENT DOCUMENTS

JP 05-058196 A 3/1993
JP 2000-075239 A 3/2000
(Continued)

OTHER PUBLICATIONS

English translation of JP 2008-151992 (Year: 2008).*
(Continued)

*Primary Examiner* — Nathan Danielsen
(74) *Attorney, Agent, or Firm* — Mattingly & Malur, PC

(57) ABSTRACT

A head-up display device that displays information including a video in a part of a field of view of an operator (407) includes a video display device (420) that is arranged at a position deviated from the field of view of the operator and generates and projects video light for projecting the information and a transparent screen (410) that is arranged in a part of the field of view of the operator, and transmit light from the field of view and reflects projection light from the video display device in a direction of the operator. A solid-state light source device (421) that reflects and mixes light emitted from a plurality of light-emitting cells (40) and emits the light obtained by the mixing in a predetermined direction is used as a light source constituting the video display device.

9 Claims, 20 Drawing Sheets

(51) Int. Cl.
*G02B 27/01* (2006.01)
*B60R 1/00* (2006.01)
*G02B 3/08* (2006.01)
*B60K 35/00* (2006.01)
*G09G 3/14* (2006.01)

(52) U.S. Cl.
CPC .............. *G02B 3/08* (2013.01); *G02B 27/01* (2013.01); *G02B 27/0149* (2013.01); *G09G 3/14* (2013.01); *G09G 3/2003* (2013.01); *H04N 9/3111* (2013.01); *H04N 9/3152* (2013.01); *H04N 9/3164* (2013.01); *H04N 9/3182* (2013.01); *B60K 2350/2017* (2013.01); *B60K 2350/2082* (2013.01); *B60R 2300/205* (2013.01); *G02B 2027/015* (2013.01); *G02B 2027/0118* (2013.01); *G02B 2027/0134* (2013.01); *G02B 2027/0141* (2013.01)

(58) Field of Classification Search
CPC .......... G09G 3/36–3/3696; G09G 5/02; G09G 2380/10; G09G 3/12; G09G 3/14; G02B 27/0101; G02B 27/0103; G02B 27/0149; G02B 2027/0105; G02B 2027/0107; G02B 2027/0112; G02B 2027/0118; G02B 2027/0132–2027/0136; G02B 2027/0141; G02B 2027/0145; G02B 2027/015; H04N 9/3111–9/3117; H04N 9/315–9/3155; H04N 9/3161; H04N 9/3164; H04N 9/3182; B60K 35/00; B60K 2350/2017; B60K 2350/2082; B60R 1/00; B60R 1/001; B60R 2300/205
See application file for complete search history.

(56) References Cited

U.S. PATENT DOCUMENTS

| | | |
|---|---|---|
| 2007/0002412 A1 | 1/2007 | Aihara |
| 2007/0195278 A1 | 8/2007 | Yokote et al. |
| 2009/0161076 A1 | 6/2009 | Chen et al. |
| 2010/0073579 A1 | 3/2010 | Okada et al. |

FOREIGN PATENT DOCUMENTS

| | | |
|---|---|---|
| JP | 2006-258884 A | 9/2006 |
| JP | 2006-276822 A | 10/2006 |
| JP | 2006-323184 A | 11/2006 |
| JP | 2007-011297 A | 1/2007 |
| JP | 2007-094384 A | 4/2007 |
| JP | 2008-292566 A | 12/2008 |
| JP | 2009-104150 A | 5/2009 |
| JP | 2010-078860 A | 4/2010 |
| JP | 2011-039395 A | 2/2011 |
| JP | 2011-164348 A | 8/2011 |
| JP | 2014-074802 A | 4/2014 |
| WO | 2008/075530 A1 | 6/2008 |
| WO | 2014/041688 A1 | 3/2014 |

OTHER PUBLICATIONS

English translation of JP 2000-075239 (Year: 2000).*
English translation of JP 2008-292566 (Year: 2008).*
Japanese Office Action received in corresponding Japanese Application No. 2016-517782 dated Jun. 6, 2017.
International Search Report of PCT/JP2014/062486 dated Jun. 17, 2014.

* cited by examiner

F I G. 1
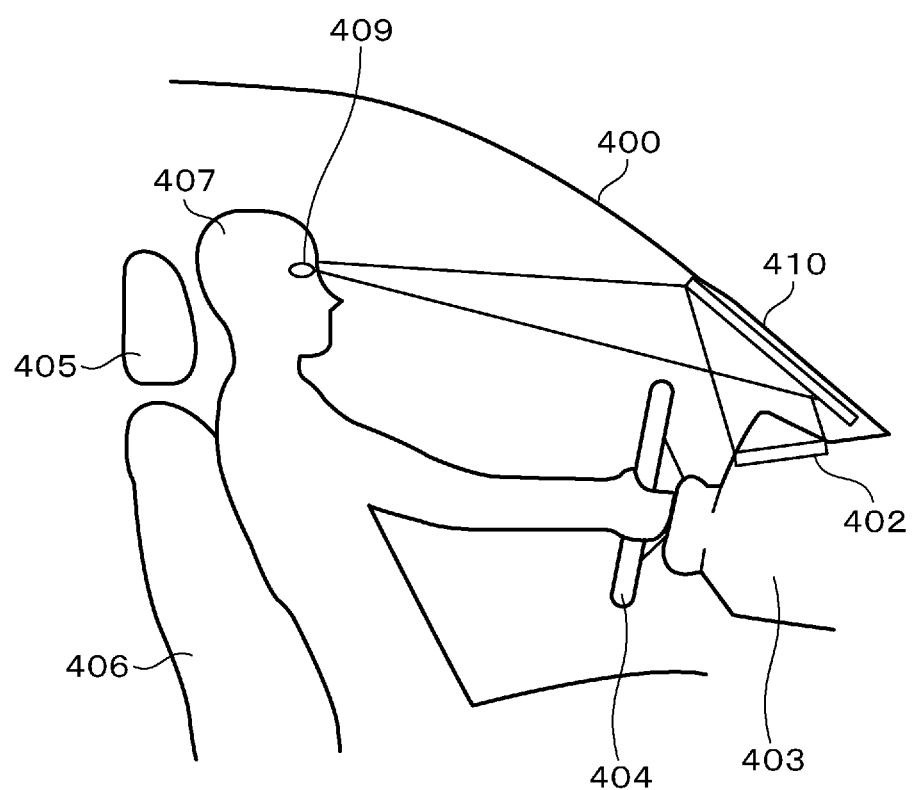

F I G. 2
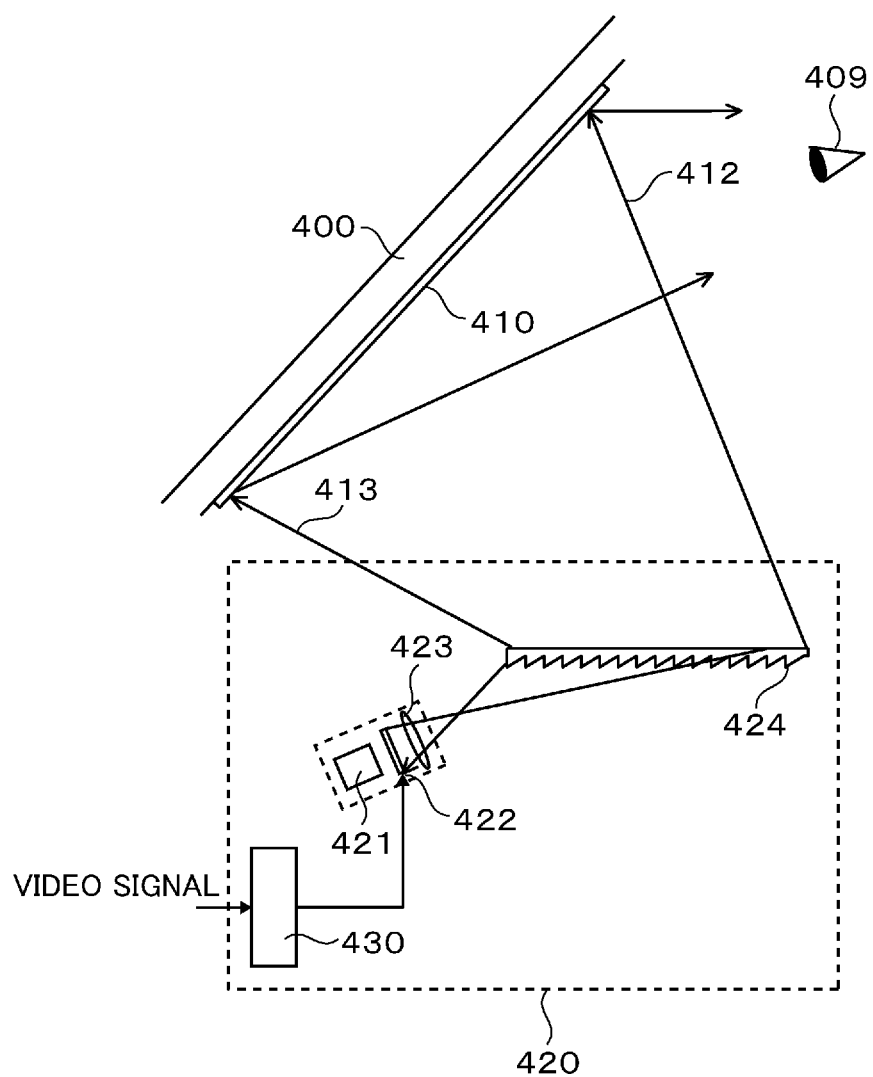

F I G. 5
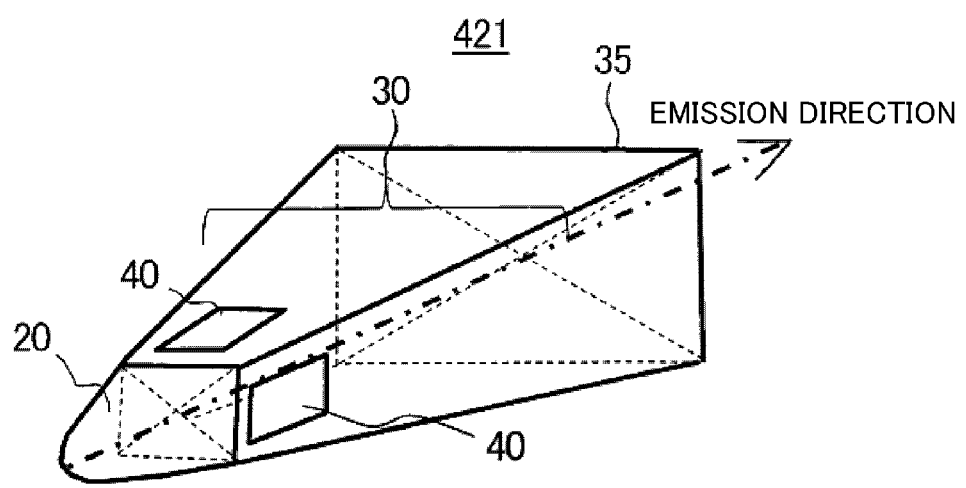
F I G. 6
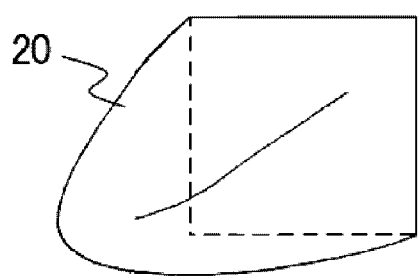

F I G. 7A
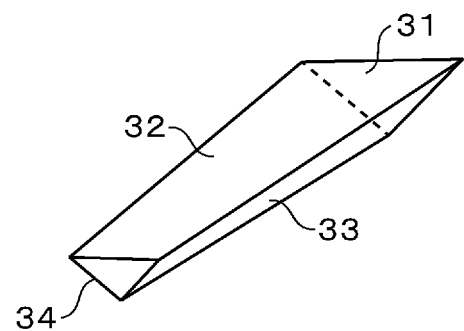
F I G. 7B
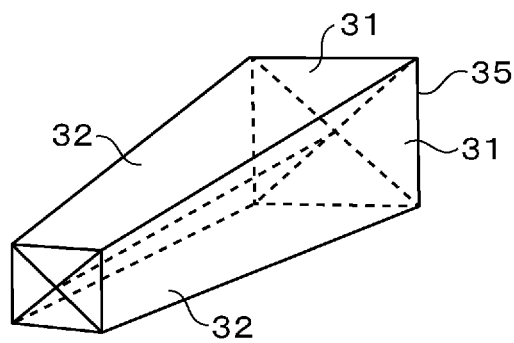

F I G. 9 A
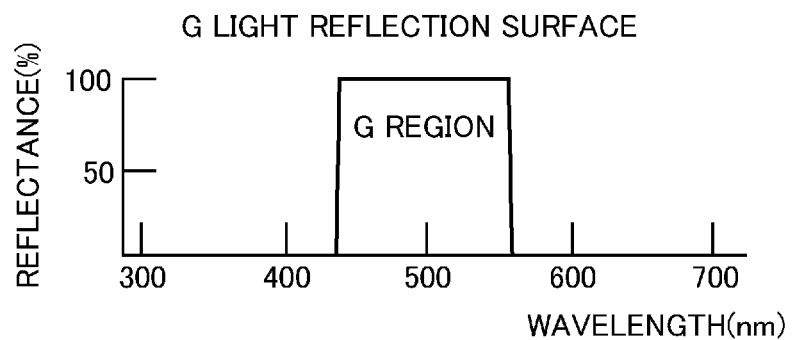
F I G. 9 B
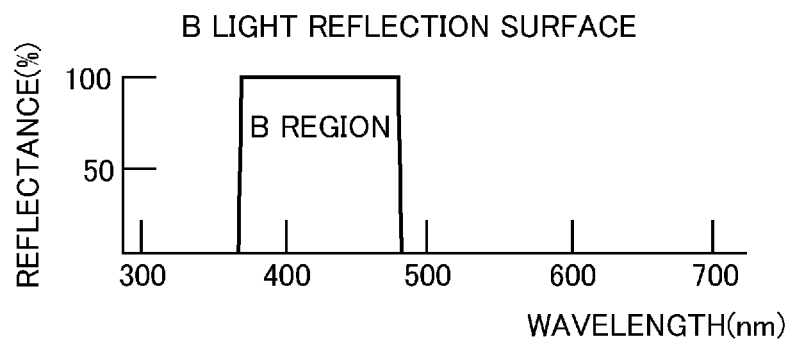
F I G. 9 C
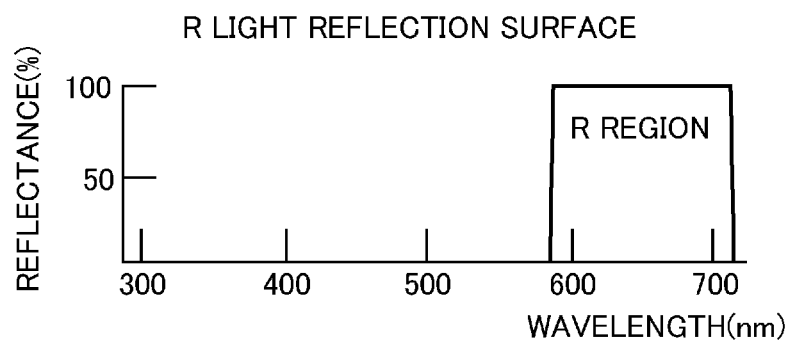

F I G. 1 0 A
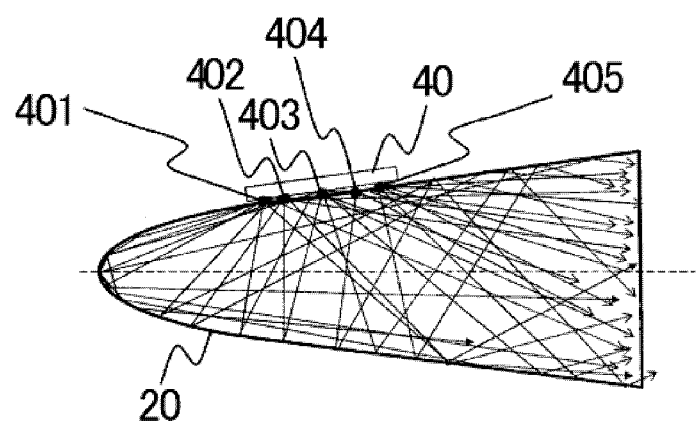
F I G. 1 0 B
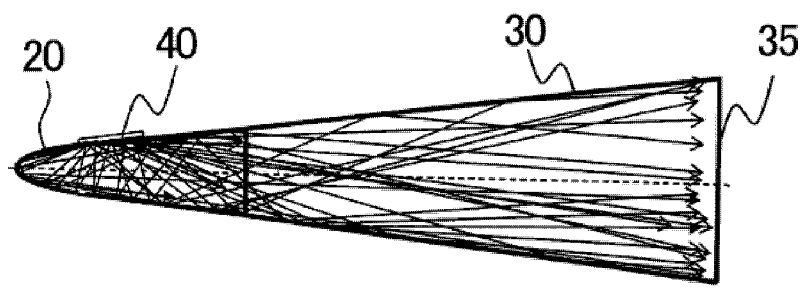

F I G. 1 1
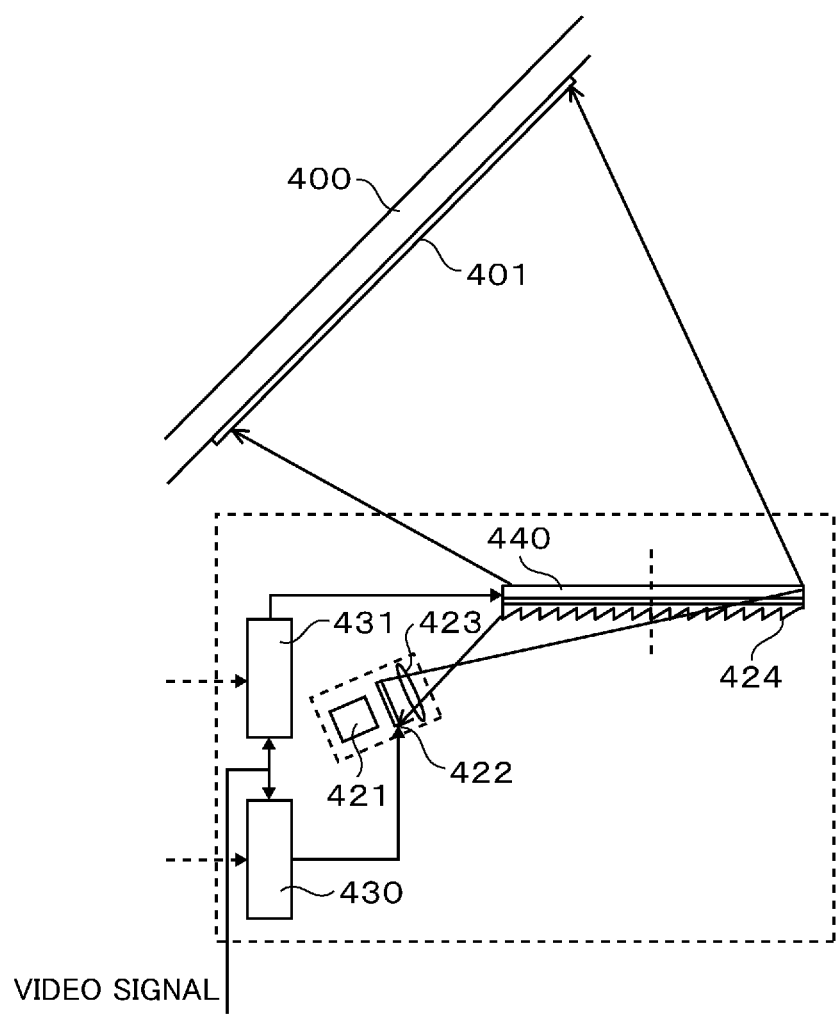

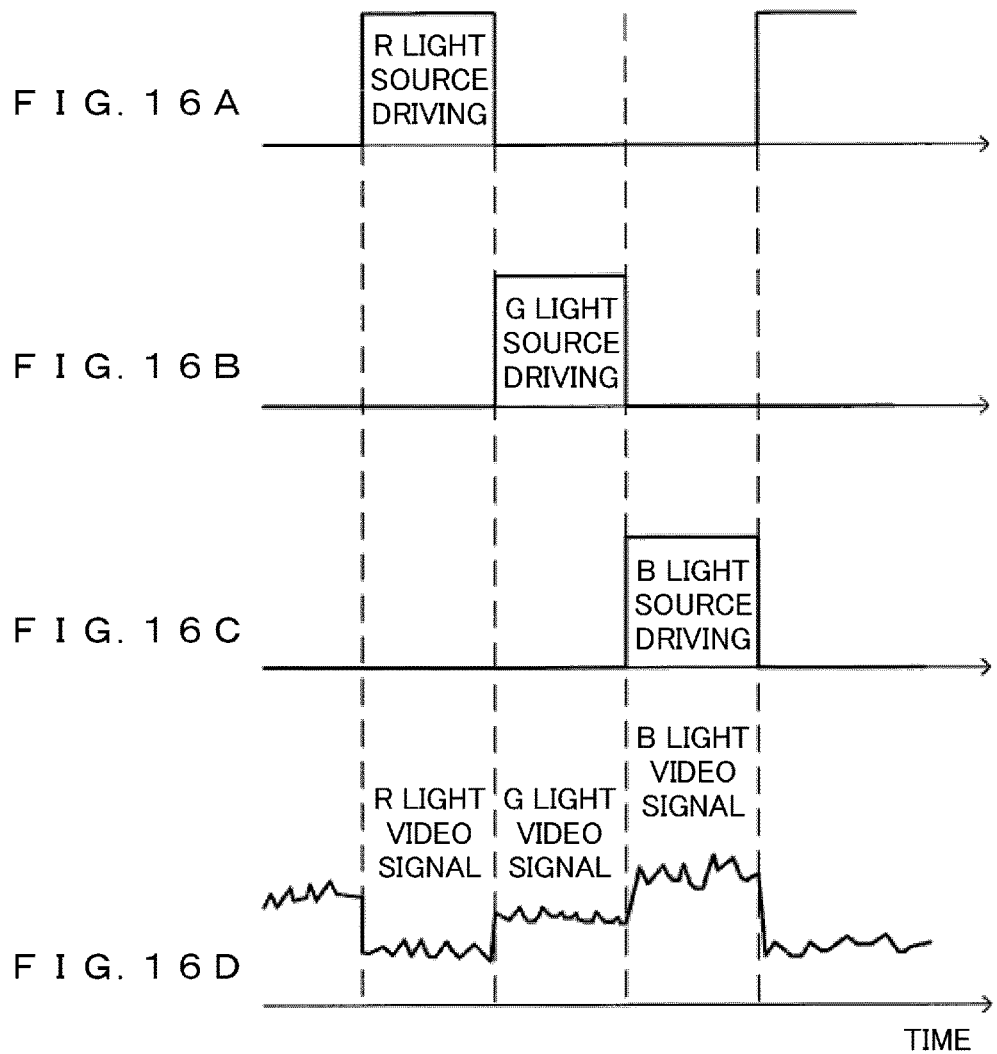

HEAD-UP DISPLAY DEVICE

TECHNICAL FIELD

The present invention relates to a head-up display device that projects information such as a video onto a windshield of an automobile or the like so that the information is directly seen in a field of view of a person through the windshield.

BACKGROUND ART

A head-up display device that is mountable in a vehicle such as an automobile, and projects a video onto a windshield (a partial reflecting unit) having an inner surface on which a metallic thin film, a dielectric multi-layer film, or the like is formed so that the video is displayed in the field of view through the windshield as a virtual image is also already known in Patent Document 1.

Patent Document 2 discloses a display device in which, for example, a video (a three-dimensional (3D) tire video) projected from a display body configured with a liquid crystal display (LCD) device installed in a dashboard is projected onto a holographic combiner attached to a part (a lower side portion) of a windshield as a vehicle display device that shows a wheel which a driver is directly unable to see through the windshield in a pseudo manner.

Further, as a navigation device that guides a route, a device that projects necessary guidance information (for example, an arrow or the like) onto a windshield of an automobile, and thus the guidance information is displayed for a driver simply and accurately without requiring detailed map data or the like is also already known in Patent Document 3.

CITATION LIST

Patent Document

Patent Document 1: JP 2006-258884 A
Patent Document 2: JP 5-58196 A
Patent Document 3: JP 2006-258884 A

SUMMARY OF THE INVENTION

Problems to be Solved by the Invention

However, in the above-described related art, it is difficult to implement a head-up display device with excellent visibility which is capable of sufficiently securing a ratio of brightness (external light) of a real image seen through the windshield and brightness of information displayed by the projection device (having a high contrast), which is a problem particularly in an in-vehicle head-up display device since it is installed in a narrow dashboard.

Generally, when a projection device employing a white lamp as a light source is applied, in order to sufficiently secure brightness and a ratio described above, a large-sized light source is necessary, and it is difficult to install the large-sized light source in the narrow dashboard.

In this regard, the present invention was made in light of the above-described problems of the related art, and it is an object of the present invention to provide a head-up display device which can be installed in a narrow dashboard and is cable of sufficiently securing brightness and a ratio (contrast) described above and providing excellent visibility even under the presence of external light.

Solutions to Problems

In order to achieve the above object, according to the present invention, provided is a head-up display device that displays information including a video in a part of a field of view of an operator and includes a video display device that is arranged at a position deviated from the field of view of the operator and generates and projects video light for projecting the information and a transparent screen that is arranged in a part of the field of view of the operator, and transmit light from the field of view and reflects projection light from the video display device in a direction of the operator, wherein a solid-state light source device that reflects and mixes light emitted from a plurality of light-emitting cells and emits the light obtained by the mixing in a predetermined direction is used as a light source constituting the video display device.

Effects of the Invention

According to the present invention, there is an excellent effect in that it is possible to provide a head-up display device which can be installed in a narrow dashboard and is cable of sufficiently securing brightness and a ratio (contrast) described above and providing excellent visibility even under the presence of external light.

BRIEF DESCRIPTION OF THE DRAWINGS

FIG. 1 is a side view illustrating an overall configuration of a head-up display device according to an embodiment of the present invention.

FIG. 2 is a side view illustrating an internal configuration of a video display device constituting a head-up display device.

FIG. 5 is a perspective view illustrating a specific structure of a solid-state light source device constituting a video display device.

FIG. 6 is an enlarged perspective view illustrating a structure of a light reflection synthesizing unit of a solid-state light source device.

FIGS. 7A and 7B are enlarged perspective views illustrating parts and all of a light synthesizing unit of a solid-state light source device.

FIGS. 9A to 9C are diagrams illustrating an example of a reflection characteristic of a wavelength-selective optical surface (film) of a light synthesizing unit.

FIGS. 10A and 10B are diagrams for describing synthesis of light in both of a light reflection synthesizing unit and a light synthesizing unit.

FIG. 11 is a side view for describing a video display device according to another embodiment (a second embodiment).

FIGS. 16A to 16D are signal waveform diagrams illustrating an example of an operation of a video display device according to a light color cycling modulation scheme.

MODE FOR CARRYING OUT THE INVENTION

Figure 3:
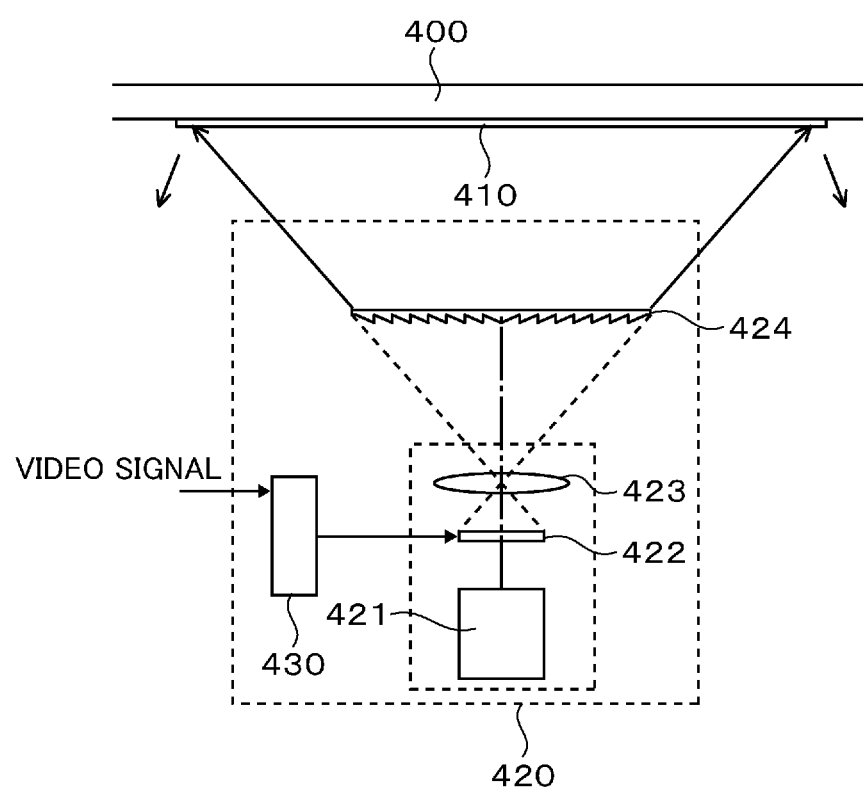
FIG. 3 is a top view illustrating an internal configuration of a video display device constituting a head-up display device.

Hereinafter, exemplary embodiments of the present invention will be described in detail with reference to the appended drawings.

First, FIG. 1 illustrates a head-up display device according to an embodiment of the present invention, particularly, a schematic configuration of a head-up display device for a vehicle that is mounted in an automobile and projects information such as a video onto a windshield so that the information is directly seen in a field of view of a person. Referring to FIG. 1, a transparent screen 410 that constitutes the head-up display device and is made of, for example, an anti-reflection film is installed along an inner surface of a lower side portion of a windshield denoted by reference numeral 400, and a video display device 420 constituting the head-up display device is installed in a dashboard 403 arranged at a position adjacent to a steering 404 in the lower side portion of the windshield 400.

In the head-up display device having the above-described configuration, a video (information) output from the video display device 420 is projected onto and reflected by the transparent screen 410 with which a direction reflection means is equipped and then enters eyes 409 of a driver (operator) 407 supported by a driver seat 406 and a head rest 405 Thus, the driver 407 can recognize various kinds of information or the like necessary for driving which is simultaneously displayed in a part of the field of view for the outside that enters the eyes 409 through the windshield 400 in a superimposed manner together with the field of view and operate the steering 404 while determining an external situation constantly, and thus a safer driving operation can be performed.

Next, FIGS. 2 and 3 are diagrams illustrating an example of a more detailed configuration of the video display device 420 including the transparent screen 410, FIG. 2 is a side view, and FIG. 3 is a top view.

As will be described below, the video display device 420 is high in use efficiency of light and capable of selectively radiating white light or light of a desired color (for example, R (red), G (green), B (blue)), and includes, for example, a light source unit 421 using an LED light source or a laser light source, an optical modulation unit (a liquid crystal (LC) panel) 422 which is an element that converts light emitted from the light source unit 421 into desired video light based on an external video signal and is configured with, for example, a TFT LC panel, a projection lens 423 that magnifies and projects the video light output from the optical modulation unit 422, an optical direction converting unit 424 that radiates (projects) the light output from the projection lens 423 toward the transparent screen 410 installed on the inner surface of the windshield 400 and is configured with, for example, a Fresnel lens sheet, and the like as illustrated in FIGS. 2 and 3. In FIGS. 2 and 3, reference numeral 430 denotes a driving circuit that drives the optical modulation unit 422 (for example, an LC panel, a reflective LC panel, or a DLP element) based on the external video signal. In FIG. 2, among wide-angle projection light, light projected onto an upper end portion of the transparent screen 410 is referred to as "upper limit light and denoted by reference numeral 412, and light projected onto a lower end portion of the screen 410 is referred to as "lower limit light" and denoted by reference numeral 413.

Figure 4A:
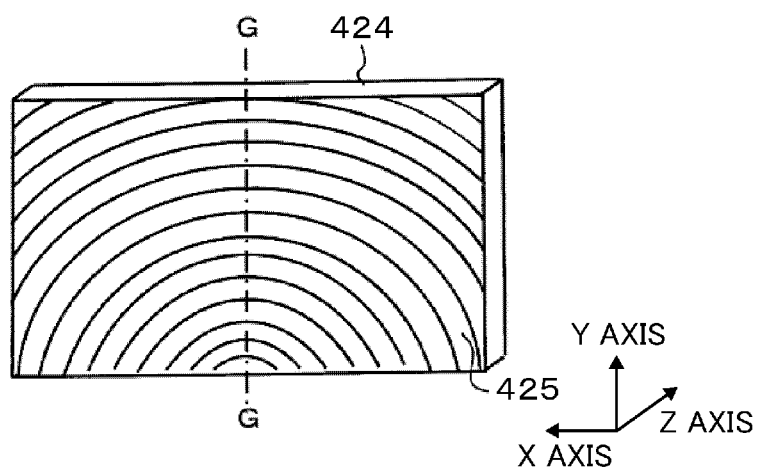
FIGS. 4A and 4B are an enlarged perspective view and a cross-sectional view illustrating a specific structure of an optical direction converting unit constituting a video display device.
Figure 4B:
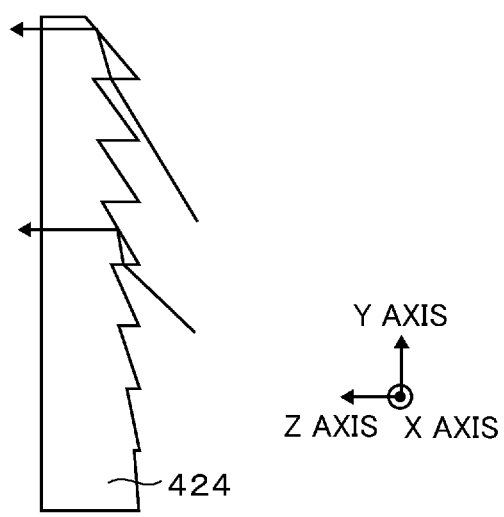

FIGS. 4A and 4B illustrate a specific configuration of the optical direction converting unit 424, FIG. 4A is a perspective view illustrating the Fresnel lens sheet viewed from the optical modulation unit (LC panel) 422 side, and FIG. 4B is a cross-sectional view taken along line G-G. As also seen from FIGS. 4A and 4B, a plurality of refractive Fresnel lenses 425 are formed on the optical direction converting unit 424 in a concentric form, and light obliquely projected from the optical modulation unit (LC panel) 422 is emitted substantially in a vertical direction due to an action of the Fresnel lenses 425 (see an arrow in FIG. 4A).

<<High-Efficiency Solid-State Light Source Device>>

Next, a detailed configuration of the light source unit 421 that is high in use efficiency of selectively radiating light and capable of radiating light of a desired color including white will be described below with reference to FIGS. 5 to 9.

First, FIG. 5 illustrates an overall configuration of the light source unit 421, and the light source unit 421 includes a light reflection synthesizing unit 20, a light synthesizing unit 30, and a plurality of light source cells 40 (four light source cells 40 in this example) as illustrated in FIG. 5. In FIG. 5, only two light source cells 40 are illustrated due to a point of view. In FIG. 5, reference numeral 35 denotes a light emission surface of the light synthesizing unit 30.

As also illustrated in FIG. 6, the light reflection synthesizing unit 20 includes an inner surface that is formed of a polished surface made of metal (aluminum or the like) in order to increase thermal conductivity and optical reflectance, a member that has undergone enhanced reflection coating, and a member of substantially a pyramid shape that has a rectangular cross section and a paraboloidal leading end portion, and a reflection surface made of an enhanced reflection film of a metallic multi-layer film is formed on the entire surface excluding the bottom portion, for example, an A liter or a surface of an A liter.

For example, the light synthesizing unit 30 is formed such that four dichroic prisms 31 of a triangular prism-like external shape in which a cross section has a triangular shape, and a bottom surface is larger than a top surface as illustrated in FIG. 7A are assembled to form a prismatic column having a rectangular cross section as illustrated in FIG. 7B. In each of the dichroic prisms 31, a reflection surface is formed on a surface 32 serving as an outer circumference surface in an assembled state, and a wavelength-selective optical surface (film) showing a dichroic characteristic formed of, for example, a metallic multi-layer film is formed on each of two surfaces 33 and 34.

Figure 8:
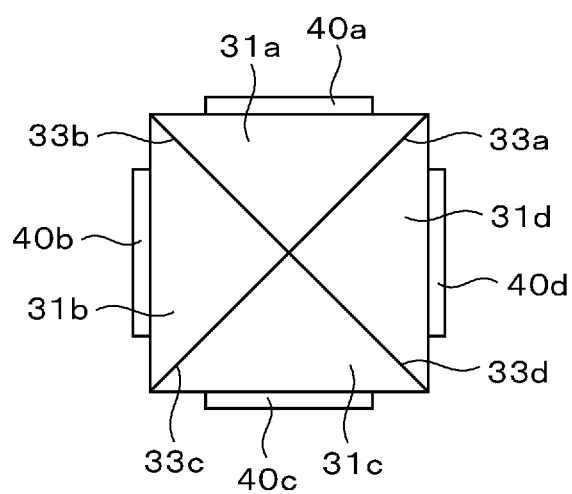
FIG. 8 is a partially enlarged cross-sectional view illustrating a relation between a light synthesizing unit and a light source cell.

Referring back to FIG. 5, the light source cell 40 is installed on the outer circumference surface of the light synthesizing unit 30 (or the light reflection synthesizing unit 20). A cross section of a portion of the light synthesizing unit 30 on which the light source cell 40 is installed is illustrated in FIG. 8. In this example, as illustrated in FIG. 8, four light source cells 40 are installed, each of the light source cells 40 includes light source cells 40R, 40G, and 40B that emit R (red) light, G (green) light and B (blue) light which are three primary colors of light, and the light source cell 40G that emits the G light is installed on two neighboring outer circumference surfaces of the light synthesizing unit 30 since it is generally difficult to obtain large output light compared to the light source cell 40R that emits the R (red) light and the light source cell 40B that emits the B (blue) light. The portion on which the light source cell 40 is installed has no reflection surface which is formed on the surface.

Subsequently, in FIG. 8, the light synthesizing unit 30 formed such that four dichroic prisms 31a to 31d are assembled and light source cells 40a to 40d installed on the outer circumference surface are illustrated using a cross section (the reflection surface formed on the surface is not formed on the portion on which each of the light source cells 40 is installed). Further, wavelength-selective optical surfaces (films) 33a to 33d showing a dichroic characteristic are formed on boundary surfaces of the light synthesizing units 30, and thus light emitted from the light source cells 40a to 40d are reflected by or pass through the wavelength-selective optical surfaces (films) 33a to 33d and further undergo color mixing, and thus light of a desired color including white can be obtained.

Next, FIGS. 9A to 9C illustrate an example of reflection characteristics of the wavelength-selective optical surfaces (films) 33a to 33d. In other words, as illustrated in FIGS. 9A to 9C, a G light reflection surface reflects light of a G wavelength region and transmits light of other wavelength regions. Similarly, a B light reflection surface reflects light of a B wavelength region, and an R light reflection surface reflects light of an R wavelength region.

Here, the description will proceed with an example of the light synthesizing unit 30 of FIG. 8. First, the light source cells 40a and 40b are used as a light source cell that emits the G (green) light, the light source cell 40c is used as a light source cell that emits the B (blue) light, the light source cell 40d is used as a light source cell that emits the R (red) light, the wavelength-selective optical surface (film) 33a is formed to reflect the G light and transmit the R light, the wavelength-selective optical surface (film) 33b is formed to reflect the R light and the B light and transmit the G light, the wavelength-selective optical surface (film) 33c is formed to reflect the G light and transmit the B light, and the wavelength-selective optical surface (film) 33d is formed to reflect the B light and the R light and transmit the G light. Thus, it is possible to separately output the R light, the G light, and the B light from the emission surface 35 (see FIG. 5).

Alternatively, by appropriately selecting reflection and transmission characteristics of the wavelength-selective optical surface (film), it is possible to output white light obtained by mixing of the R light, the G light, and the B light from the emission surface 35 (see FIG. 5).

Next, synthesis of light in the light reflection synthesizing unit 20 and in both of the light reflection synthesizing unit 20 and the light synthesizing unit 30 will be described with reference to FIGS. 10A and 10B. FIGS. 10A and 10B are cross-sectional views which is taken along an optical axis direction (see an alternate long and short dash line in FIG. 5) and illustrate the light reflection synthesizing unit 20 and both of the light reflection synthesizing unit 20 and the light synthesizing unit 30. Here, the description will proceed with an example in which the light source cell 40 is installed on the top surface of the light reflection synthesizing unit 20.

The light reflection synthesizing unit 20 is preferably made of metal such as an A liter which is higher in thermal conductivity when heat dissipation of the light source cell is considered and excellent in light reflection characteristic, and the inner surface of the light reflection synthesizing unit 20 is formed of an elliptical surface, a paraboloidal surface, a spherical surface, or the like and efficiently conducts light flux radiated from the light source cells 40a to 40d to the light synthesizing unit 30. FIG. 10A illustrates the light reflection synthesizing unit 20 according to an embodiment of the present invention, the light reflection synthesizing unit 20 has substantially a paraboloidal external shape as a whole, and the cross section along the optical axis direction (see the alternate long and short dash line in FIG. 5) which is an emission direction of light has substantially a parabolic shape. Further, a cross section vertical to the optical axis direction is substantially an elliptical shape in a portion of a leading end further than a center portion and is a square shape or a rectangular shape in a portion from the center portion to a joint portion with the light synthesizing unit 30, and the light reflection synthesizing unit 20 and the light synthesizing unit 30 are consecutively connected. As described above, the reflection surface is formed on the outer circumference surface of the light reflection synthesizing unit 20, and the light emitted from the light source cell 40 is reflected by the light synthesizing unit 30.

In FIG. 10A, a traveling direction of light emitted from the emission points 401 to 405 of the light source cell 40 in the light reflection synthesizing unit 20 is indicated by arrows. Since the leading end portion of the light reflection synthesizing unit 20 has substantially a paraboloidal surface, the light emitted from the emission points 401 to 405 is repeatedly reflected and mixed in the light reflection synthesizing unit 20, and uniform light flux is consequently emitted from the light synthesizing unit 30.

FIG. 10B is a diagram illustrating traveling of light beams in both of the light reflection synthesizing unit 20 and the light synthesizing unit 30, and the light flux incident from the light reflection synthesizing unit 20 onto the light synthesizing unit 30 is reflected by the outer circumference surface of the light synthesizing unit 30, and light density of the light flux traveling toward the emission surface becomes uniform and is emitted to the outside. At this time, light of a specific wavelength is reflected by the wavelength-selective optical surfaces (films) 33a to 33d while passing through the dichroic prisms 31a to 31d constituting the light synthesizing unit 30. In other words, when the wavelength-selective optical surfaces (films) 33a to 33d are installed, the number of reflections in the light synthesizing unit is increased to be larger than when reflection is performed only by the reflection surface formed on the outer circumference surface of the light synthesizing unit 30, and thus the light use efficiency is improved. For example, when a reflection film made of aluminum is formed on the outer circumference surface of the light synthesizing unit 30, and internal light is reflected only by the reflection film, reflection loss of about 5% per reflection occurs, whereas when the wavelength-selective optical surfaces (films) 33a to 33d are installed, light passing through without undergoing reflection can be used as emitted light flux later, and thus total light use efficiency is not lowered.

Further, when the wavelength-selective optical surfaces (films) 33a to 33d are installed, the number of reflections of light in the light reflection synthesizing unit 20 is increased, and thus an intensity distribution of the reflected light flux can become more uniform. In other words, when uniformity of output light flux becomes constant, the length of the light reflection synthesizing unit 20 in the optical axis direction can be reduced to be smaller than in the case of only reflection by the outer circumference surface. Further, since an area size of an incidence surface of the light synthesizing unit 30 (the emission surface of the light reflection synthesizing unit 20) is larger than an area size of the emission surface 35, an angle of emitted light beams gets close to the optical axis direction, and thus a directional characteristic can be narrowed down to a narrow area.

In other words, according to the high-efficiency solid-state light source device, it is possible to implement the light source device that is high in the light use efficiency and capable of selectively outputting light of a desired color in which a diffusion angle of light flux is narrowed.

<<Optical Modulation Unit (LC Panel)>>

Next, a plurality of embodiments of a detailed structure of the optical modulation unit (LC panel) when the high-efficiency solid-state light source device is used will be described below.

<First Embodiment>

As illustrated in FIG. 2 and FIG. 3, the high-efficiency solid-state light source device is used as the light source unit 421, white light emitted from the light source is incident on, for example, a transmissive optical modulation unit (LC panel) 422 configured with a TFT LC panel, and converted into a desired video light based on an external video signal, and the converted video light is projected onto the Fresnel lenses 425 through the projection lens 423.

According to this configuration, it is possible to implement the head-up display device that projects desires information onto the lower side portion of the windshield 400 through a relatively simple configuration.

<Second Embodiment>

Next, another embodiment (a second embodiment) of the optical modulation unit (LC panel) will be described with reference to FIG. 11. As illustrated in FIG. 11, in the second embodiment, in addition to the configuration described in the first embodiment, a second image display LC panel 440 is installed to cover substantially the entire region of the Fresnel lenses 425 at the emission surface side, and a second LC panel driving circuit 431 that drives the second image display LC panel 440 is installed.

The second image display LC panel 440 performs optical modulation based on an external video signal (common) through the second LC panel driving circuit 431. According to this configuration, since a contrast to be obtained is a product of a contrast ratio of the second image display LC panel 440 and a contrast ratio of the first image display LC panel 422, it is possible to significantly improve a contrast ratio of a display image which is very important, particularly, to the head-up display device that displays a projection video in the field of view obtained by the external light. In other words, it is possible to obtain a sufficient contrast ratio while employing a relative cheap panel as the first image display LC panel 422 and the second image display LC panel 440.

Figure 12A:
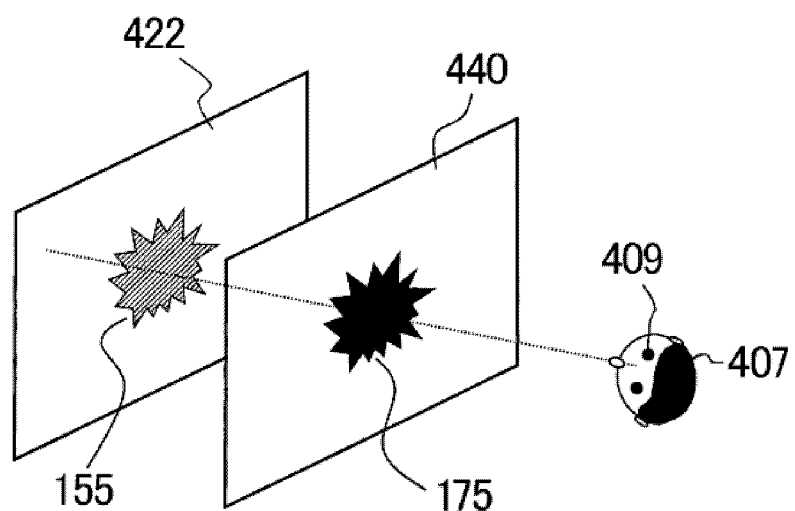
FIGS. 12A and 12B are diagrams for describing 3D display according to another embodiment (the second embodiment).
Figure 12B:
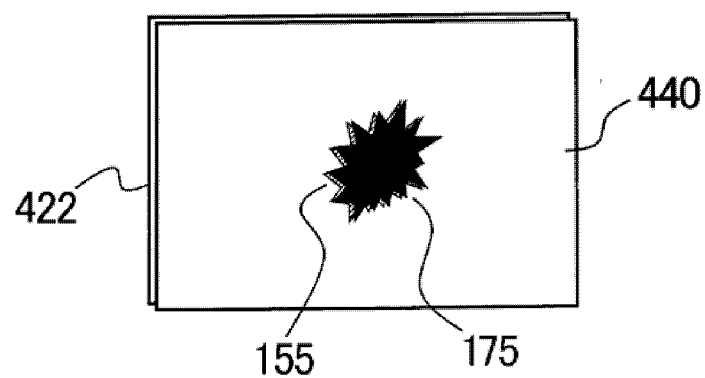

In this configuration, when the first image display LC panel 422 and the second image display LC panel 440 perform the optical modulation based on different video signals output from a 3D display device (not illustrated) as indicated by broken line arrows rather than the optical modulation based on an external video signal (common) indicated by a sold line, it is possible to implement a head-up display device capable of projecting information in a 3D (3D display) manner using first image 155 by the first image display LC panel 422 and a second image 175 by the second image display LC panel 440 as illustrated in FIGS. 12A and 12B.

<Third and Fourth Embodiments>

Figure 13:
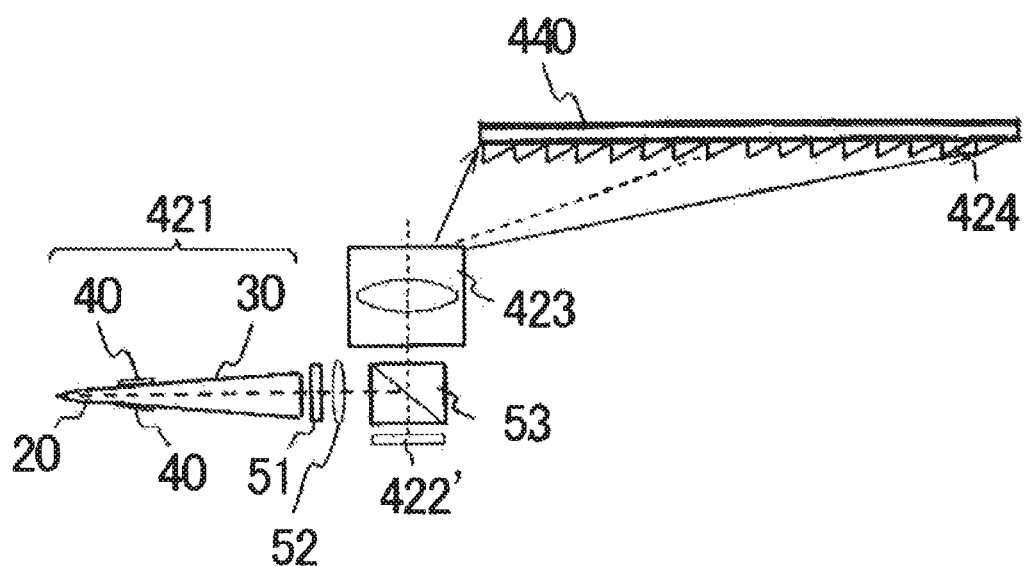
FIG. 13 is a side view for describing a video display device according to another embodiment (a third embodiment).

As illustrated in FIG. 13, for example, a phase difference generating unit 51 configured with a phase plate and a field lens 52 are installed on the emission surface side of the solid-state light source unit 421 configured with the light reflection synthesizing unit 20, the light synthesizing unit 30, and the light source cell 40, light emitted from the solid-state light source unit 421 is guided onto a first reflective optical modulation unit (for example, an LC panel, a reflective LC panel, a DLP, or the like) 422' through a polarization splitting element 53 such as a polarization prism, and then reflected light modulated by the optical modulation unit is projected onto the Fresnel lenses 425 through the projection lens 423. In this example, a second optical modulation unit 440 is installed on a light emission side of the Fresnel lenses 425.

Figure 14:
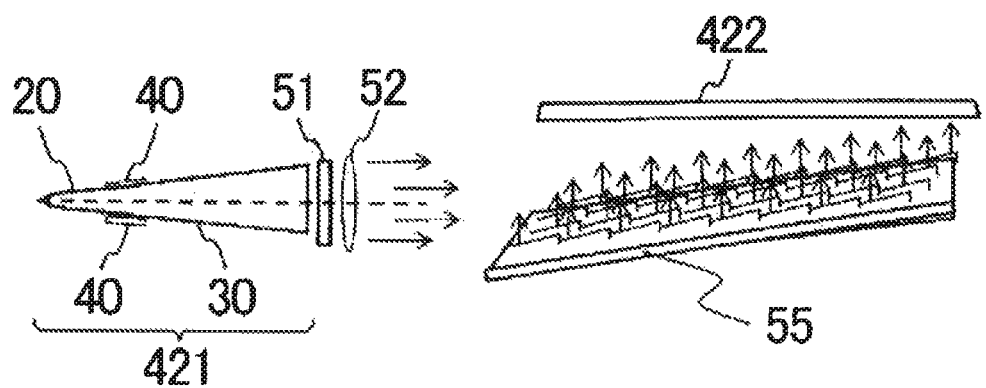
FIG. 14 is a side view for describing a video display device according to another embodiment (a fourth embodiment).

Alternatively, as illustrated in FIG. 14, light which is emitted from the solid-state light source unit 421 and then passes through the phase difference generating unit 51 and the field lens 52 may be guided onto the transmissive optical modulation unit (LC panel) 422 through a light guiding member which is made of resin such as acrylic, polystyrene, polycarbonate, or polyethylene terephthalate (PET) and formed such that a plurality of saw-like protrusions are formed on the surface.

In the first to fourth embodiments, the white light obtained by mixing of the R light, the G light, and the B light is output from the light emission surface 35 of the solid-state light source unit 421 (see FIG. 5), and thus the light source cells 40a to 40d constituting the light source unit are constantly driven by a power supply circuit (not illustrated).

According to the high-efficiency solid-state light source device of the present invention, in addition to the white light, the R (red) light, the G (green) light, and the B (blue) light are selectively output in a time division manner, and thus a modulation scheme to be described in detail below, that is, a light color cycling modulation scheme can be also used.

<<Light Color Cycling Modulation Scheme>>

Figure 15:
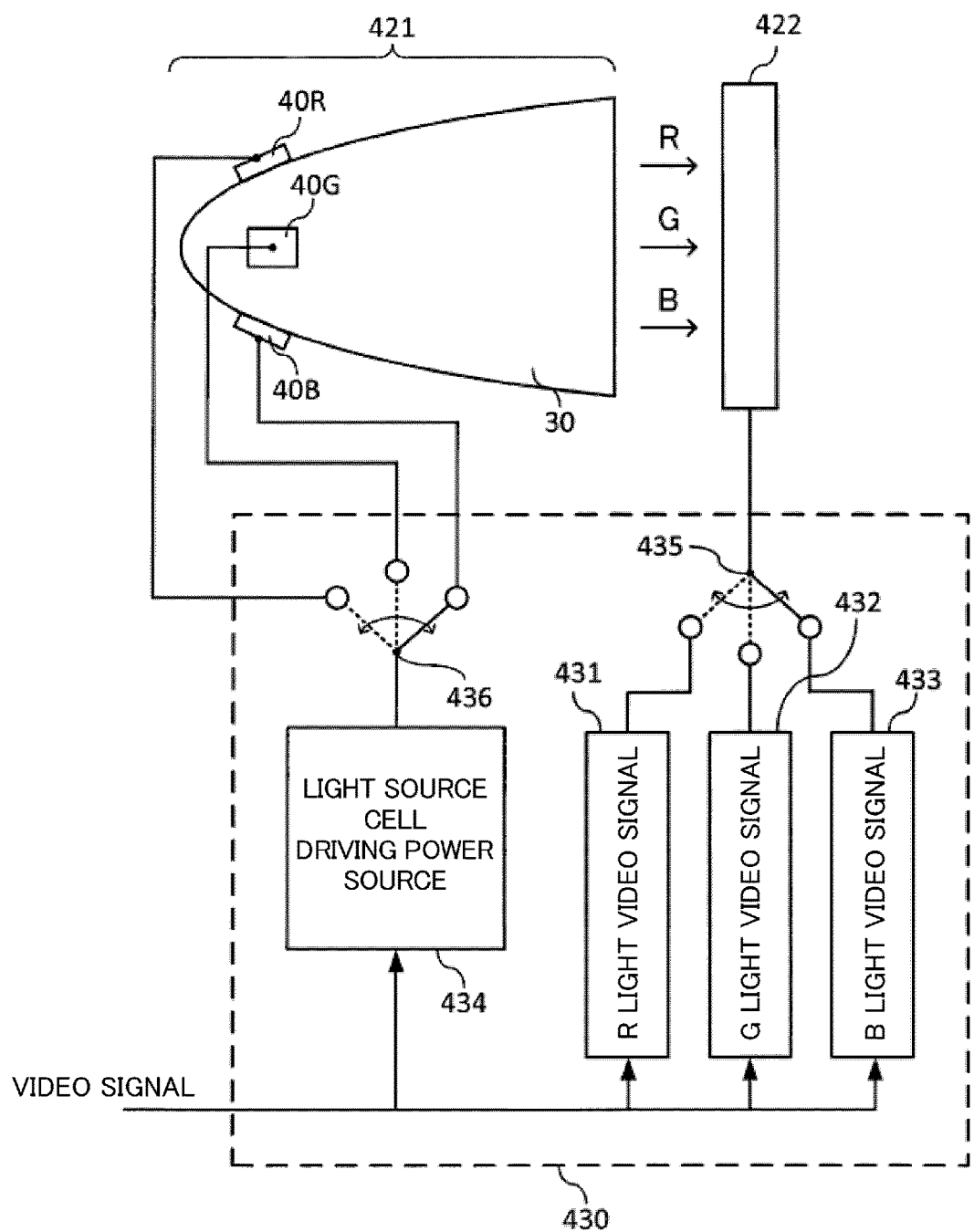
FIG. 15 is a block diagram illustrating an example of a configuration of a video display device according to a light color cycling modulation scheme.

The light color cycling modulation scheme can be implemented using the configuration illustrated in FIGS. 2 and 3, but as illustrated in FIG. 15, the light emitted from the solid-state light source unit 421 is selectively switched to the R light, the G light, and the B light sequentially based on an external video signal, and the video signal to be output to the optical modulation unit 422 is sequentially switched to an R light video signal, a G light video signal, and a B light video signal.

For example, as illustrated in FIG. 15, the LC panel driving circuit 430 includes converting circuits 431, 432, and 433 that generate the R light video signal, the G light video signal, and the B light video signal based on an input video signal and a light source cell driving power supply circuit 434 that drives the light source cell 40.

According to the above-described configuration of the optical modulation unit driving circuit 430, the following operation is performed through switch circuits 435 and 436 which operate in synchronization with each other as illustrated in FIGS. 16A to 16D. In other words, when a driving current is supplied from the light source cell driving power supply circuit 434 to the light source cell 40R serving as a light source of the R light through the switch circuit 436 (see FIG. 16A), the R light video signal is output to the optical modulation unit 422 through the switch circuit 435 (see FIG. 16D). Similarly, when a driving current is supplied from the light source cell driving power supply circuit 434 to the light source cell 40G serving as a light source of the G light (see FIG. 16B), the G light video signal is output to the optical modulation unit 422 through the switch circuit 435 (see FIG. 16D). Further, when a driving current is supplied from the light source cell driving power supply circuit 434 to the light source cell 40B serving as a light source of the B light (see FIG. 16C), the G light video signal is output to the optical modulation unit 422 through the switch circuit 435 (see FIG. 16D). The switching of the colors emitted from the light source cells and the video signals of the respective colors are performed with a cycle of, for example, 120 Hz to 480 Hz. Thus, light emitted from respective pixels of the LC panel is recognized as natural color obtained by mixing of respective color lights by human eyes.

Figure 17A:
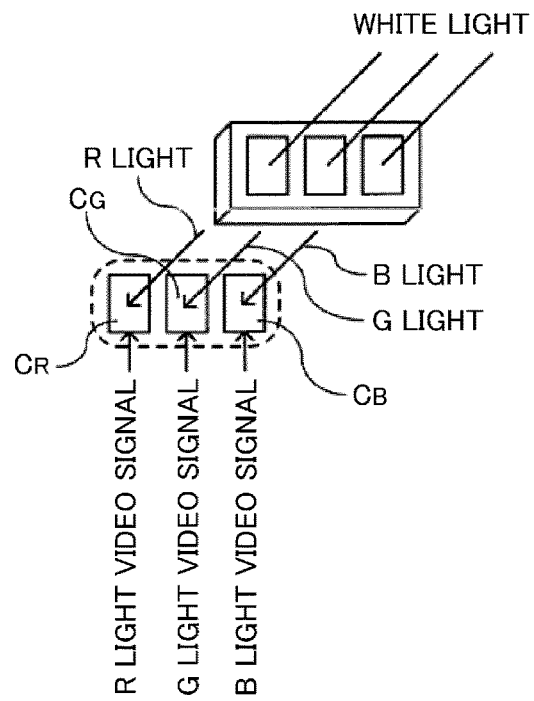
FIGS. 17A and 17B are explanatory diagrams for describing an effect obtained by a video display device according to a light color cycling modulation scheme.

According to the above-described configuration, the following various effects are obtained compared to the modulation scheme that modules the white light according to the related art. In other words, as illustrated in FIG. 17A, in the modulation scheme that modulates the white light according to the related art, the white light emitted from the light source is split and converted into the R light, the G light, and the B light, for example, through the color filter F, and the R light, the G light, and the B light are incident onto LC cells $C_R$, $C_G$, and $C_B$ corresponding to LC panels driven by the R light video signal, the G light video signal, and the B light video signal and modulated, and as a result, a desired color video is projected through the R light, the G light, and the B light which are modulated.

Figure 17B:
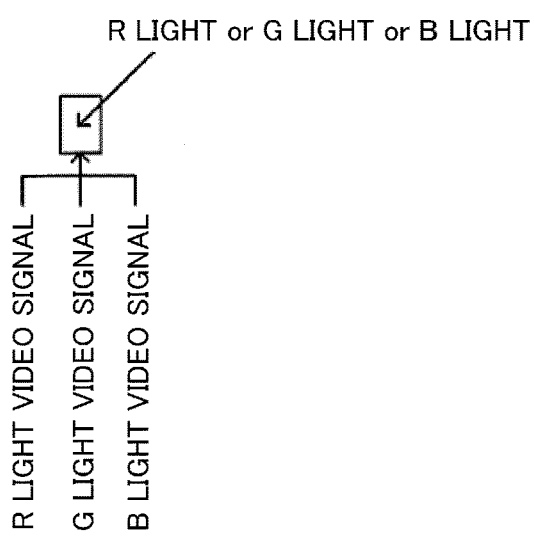

On the other hand, according to the light color cycling modulation scheme of the present invention, as illustrated in FIG. 17B, the light emitted from the solid-state light source unit 421 serving as the light source are selectively switched to the R light, the G light, or the B light sequentially, and thus the color lights are sequentially incident on the LC cells C constituting the LC panel and then modulated, and as a result, a desired color video is obtained by projecting the R light video light, the G light video light, and the B light video light which are sequentially obtained.

As described above, according to the light color cycling modulation scheme of the present invention, compared to the modulation scheme that modulates the white light according to the related art, first, the color filter F that splits and converts the white light into the R light, the G light, and the B light, and thus it is possible to prevent absorption of light by the color filter F. As a result, it is possible to significantly improve the use efficiency of the light from the light source.

In addition, in the modulation scheme that modulates the white light according to the related art, the three the LC cells $C_R$, $C_G$, and $C_B$ which are adjacent to one another in the horizontal direction of the LC panel are dealt as one image unit, but in in the light color cycling modulation scheme of the present invention, only one LC cell C can be dealt as one image unit, and thus a resolution of an obtained image, particularly, in the horizontal direction can be improved three times.

In other words, when the light color cycling modulation scheme of the present invention is employed, since the light use efficiency is increased, and the high-resolution projection image is obtained, it is very useful for the head-up display device that displays the projection video in the field of view obtained by the external light. Further, for example, when the second image display LC panel is installed as in the second embodiment, it is possible to improve the contrast ratio of the display image and display the 3D video.

<<Specific Configuration of Projection Lens>>

Next, a specific configuration of the projection lens 423 that magnifies and projects the video light output from the optical modulation unit while reducing trapezoidal distortion in an inclined direction will be described below in detail.

Figure 18A:
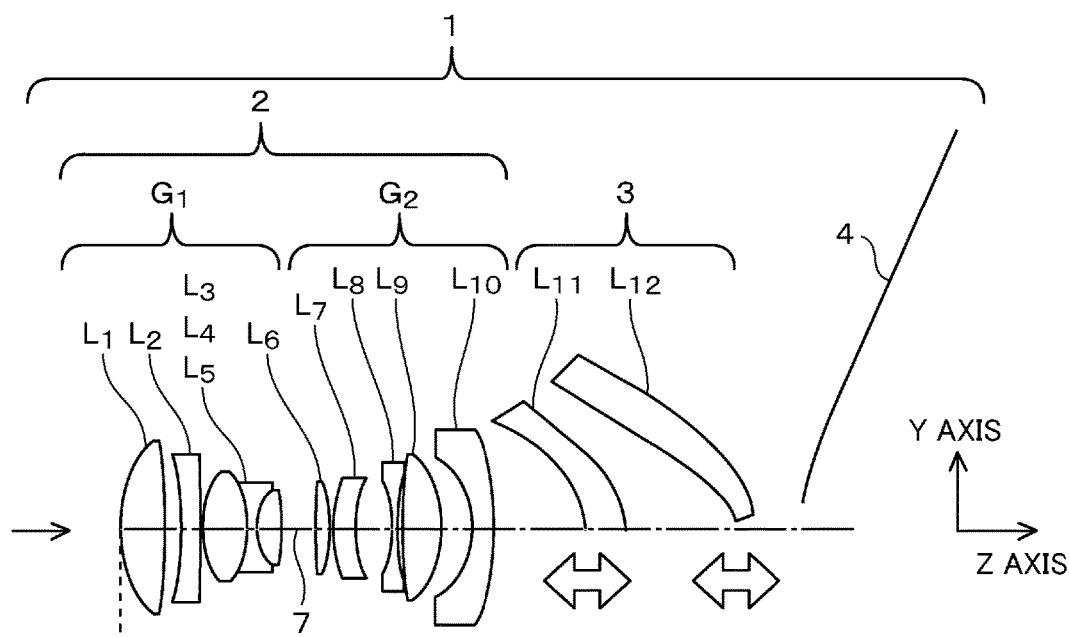
FIGS. 18A and 18B are lens configuration diagrams illustrating a specific configuration of a projection lens of a video display device.
Figure 18B:
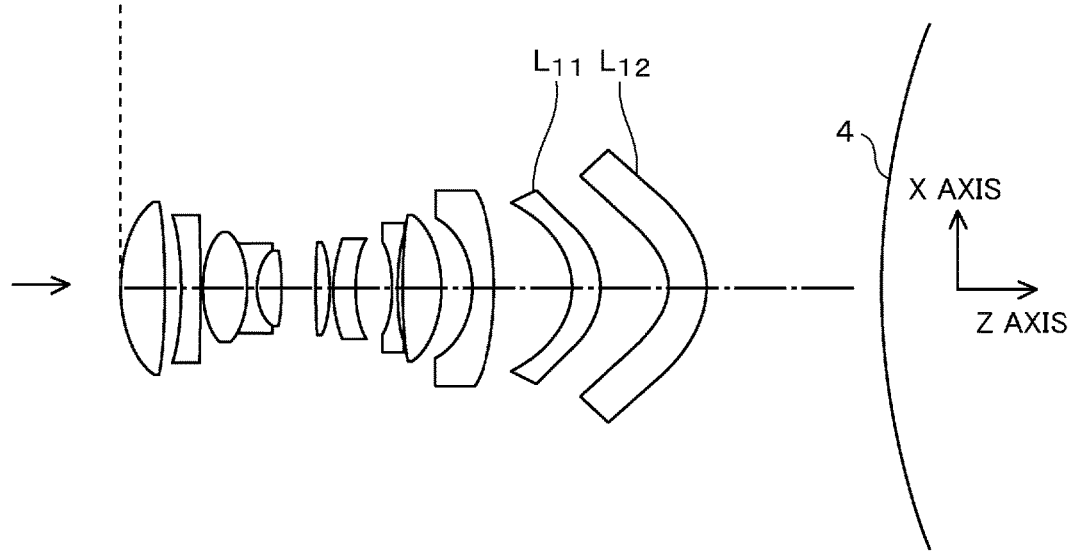
Figure 19:
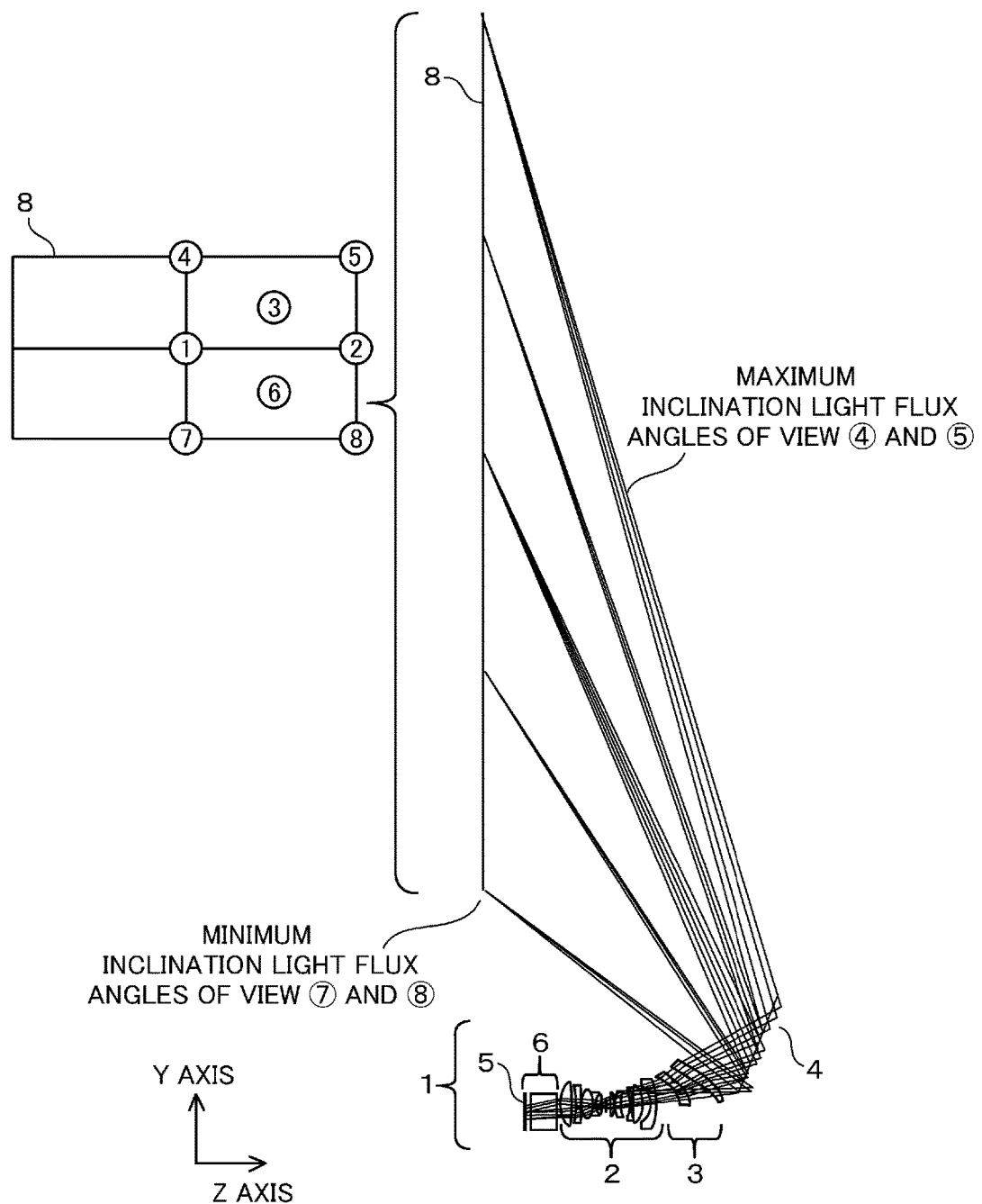
FIG. 19 is a light beam diagram for describing a characteristic of a projection lens.

FIGS. 18A and 18B are configuration diagrams of a projection optical system 1 serving as the projection lens 423, and FIG. 19 is a light beam diagram thereof. The video light emitted from the LC panel 422 serving as a video display element or the like passes through a filter or the like as necessary, undergoes a refraction action by a coaxial lens system 2 and a free curved surface lens system 3 and a reflection action by a free curved surface mirror 4, and then is projected onto the optical direction converting unit 424 configured with the Fresnel lens sheet.

The coaxial lens system 2 is a retrofocus type system including a first lens group $G_1$ having a positive refractive power and a second lens group $G_2$ having a negative refractive power.

The first lens group $G_1$ includes a lens $L_1$ that is made of glass and has a positive refractive power and a small curvature radius oriented to a reduction side, an aspheric lens $L_2$ made of plastic, a biconvex lens $L_3$ that is made of glass and has a positive refractive power, a biconcave lens $L_4$ that is made of glass and has a negative refractive power, a biconvex lens $L_5$ that is made of glass and has a positive refractive power, and a biconvex lens $L_6$ that is made of glass and has a positive refractive power and a small curvature radius oriented to an enlargement side, and the lenses $L_3$ to $L_5$ constitutes a stacked triplet lens.

The refractive power of the lens $L_1$ is larger than 1.8, a glass material whose abbe number is larger than 70 is applied to the lens $L_3$ and the lens $L_5$, a glass material whose abbe number is smaller than 25 is applied to the lens $L_4$, a glass material whose abbe number is smaller than 35 is applied to the lens $L_6$.

The second lens group $G_2$ includes an aspheric lens $L_7$ of a meniscus shape that is made of plastic and has a negative refractive power and a convex surface oriented to a reduction side, a biconcave lens $L_8$ that is made of glass and has a negative refractive power, a biconvex lens $L_9$ that is made of glass and has a positive refractive power and a small curvature radius oriented to an enlargement side, and an aspheric lens $L_{10}$ of a meniscus shape that is made of plastic and has a negative refractive power and a convex surface oriented to an enlargement side.

A glass material whose abbe number is larger than 70 is applied to the lens $L_8$, and a glass material whose abbe number is smaller than 35 is applied to the lens $L_9$.

The free curved surface lens system 3 is configured with a free curved surface lens $L_{11}$ of a meniscus lens shape that is made of plastic and has a convex surface oriented to an enlargement side and a free curved surface lens $L_{12}$ of a meniscus lens shape that is made of plastic and has a convex surface oriented to an enlargement side.

Lens data is shown in the following Table 1, when a center position of a curvature radius is in a traveling direction, the curvature radius is indicated. An inter-surface distance indicates a distance from an apex position of each surface to an apex point of a next surface.

TABLE 1

| Name | | Shape | Curvature ratio | Inter-surface distance | Glass material name | Decentering/falling | | |
|---|---|---|---|---|---|---|---|---|
| | | | | | | Details | Decentering | Falling |
| Paraboloidal surface | 0-th surface | Plane | ∞ | 0.303 | | | | |
| Filters | 1-st surface | Spherical surface | ∞ | 0.65 | EAGLE_XG_ | | | |
| | 2-nd surface | Spherical surface | ∞ | 3 | Corning | | | |
| Filters | 3-rd surface | Spherical surface | ∞ | 14 | BSC7_HOYA | | | |
| | 4-th surface | Spherical surface | ∞ | 2.000 | | | | |
| L1 | 5-th surface | Spherical surface | 18.876 | 5.920 | FDS90_HOYA | Ordinary decentering | 4.215 | −0.615 |
| | 6-th surface | Spherical surface | −102 | 2.454 | | | | |
| L2 | 7-th surface | Aspheric surface | 226.8206 | 3 | PMMA | | | |
| | 8-th surface | Aspheric surface | 212.1346 | 0.3 | | | | |
| L3 | 9-th surface | Spherical surface | 13.952 | 6.359 | FC5_HOYA | | | |
| L4 | 10-th surface | Spherical surface | −12.292 | 1 | FDS90_HOYA | | | |
| L5 | 11-th surface | Spherical surface | 8.159 | 3.67 | FC5_HOYA | | | |
| | 12-th surface | Spherical surface | −18.785 | 1.800 | | | | |
| Aperture diaphragm | 13-th surface | Spherical surface | ∞ | 3.039 | | | | |
| L6 | 14-th surface | Spherical surface | 96.388 | 2.2 | EFD1_HOYA | | | |
| | 15-th surface | Spherical surface | −19.18 | 0.300 | | | | |
| L7 | 16-th surface | Aspheric surface | 28.3567 | 3 | PMMA | | | |
| | 17-th surface | Aspheric surface | 17.6728 | 5.014 | | | | |
| L8 | 18-th surface | Spherical surface | −19.465 | 1 | FC5_HOYA | | | |
| | 19-th surface | Spherical surface | 36.5 | 0.706 | | | | |
| L9 | 20-th surface | Spherical surface | 115 | 5.4 | EFD15_HOYA | | | |
| | 21-st surface | Spherical surface | −14.94 | 4.216 | | | | |
| L10 | 22-nd surface | Odd-numbered polynomial equation aspheric surface | −14.1619 | 3 | PMMA | | | |
| | 23-rd surface | Odd-numbered polynomial equation aspheric surface | −110.0357 | 12.846* | | | | |
| L11 | 24-th surface | XY polynomial equation surface | ∞ | 5.7 | PMMA | DAR | 1.536 | 0 |
| | 25-th surface | XY polynomial equation surface | ∞ | 8.831* | | DAR | 0.350 | 0 |
| L12 | 26-th surface | XY polynomial equation surface | ∞ | 6.1 | PMMA | DAR | 8.484 | 0 |
| | 27-th surface | XY polynomial equation surface | ∞ | 0 | | DAR | 8.484 | 0 |
| Return to 23-rd surface | 28-th surface | Dummy surface | ∞ | 58.797 | | | | |
| M13 | 29-th surface | XY polynomial equation surface | ∞ | 0 | | DAR | 39.763 | −23.865 |
| | 30-th surface | Dummy surface | ∞ | −434.005* | | Ordinary decentering | 0.000 | −67.007 |
| Image surface | 31-th surface | Plane | ∞ | 0 | | DAR | 0 | 66.573 |

| | | 35 inches | 40 inches | 45 inches | 50 inches |
|---|---|---|---|---|---|
| Inter-surface distance | 23-rd surface | 12.261 | 12.846 | 13.261 | 13.615 |
| | 25-th surface | 9.026 | 8.831 | 8.640 | 8.502 |
| | 30-th surface | −380.6 | −434.0 | −487.3 | −540.5 |

Decentering is a value in a Y-axis direction, falling is rotation in an X-axis direction within a YZ plane, decentering/falling works in the order of decentering and falling in a corresponding surface, and in "ordinary decentering," a next surface is arranged at a position of an inter-surface distance on a new coordinate system on which decentering/falling has worked. On the other hand, "DAR" stands for decenter and return, and decentering and falling work on only a corresponding surface and has no influence a next surface.

PMMA in a glass material name is plastic acrylic.

The following Table 2 shows free curved surface coefficients defined in the following Formula 1.

[Formula 1]

$$Z = \frac{c \cdot (x^2 + y^2)}{1 + \sqrt{1 - (1-K)c^2 \cdot (x^2 + y^2)}} + \Sigma\Sigma(Cj(m,n) \times x^m \times y^n)$$

$$j = [(m+n)^2 + m + 3n]/2 + 1$$

The following table 3 shows aspheric coefficients defined by the following Formula 2.

[Formula 2]

$$Z = \frac{c \cdot h^2}{1 + \sqrt{1 - (1-K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

TABLE 3

|   | L2A surface | L2B surface | L7A surface | L7B surface |
|---|---|---|---|---|
| 1/c | 226.8206 | 212.1346 | 28.3567 | 17.6728 |
| K | 0 | 0 | 0 | 0 |
| A | −1.01422E−04 | −8.40636E−06 | −5.14006E−05 | −1.46558E−04 |
| B | −4.43439E−07 | −8.63643E−07 | 4.27451E−06 | 4.40512E−06 |
| C | 2.06693E−09 | 1.40764E−09 | −6.74935E−09 | 4.06087E−09 |
| D | −9.93063E−13 | −2.42245E−11 | −3.98508E−10 | −2.27554E−10 |
| E | 5.12260E−14 | −1.65620E−13 | 8.68615E−13 | 1.79141E−12 |
| F | −2.22566E−16 | 2.70698E−16 | 1.02325E−13 | 7.94434E−14 |
| G | −3.37600E−18 | 2.66218E−17 | 8.92534E−16 | 4.01173E−16 |
| H | 5.67012E−22 | 2.92561E−19 | −2.36022E−17 | −1.11014E−17 |
| J | 9.44392E−23 | −3.31018E−21 | −5.28706E−20 | 9.53448E−20 |

TABLE 2

| Code | | L11A surface | L11B surface | L12A surface | L12B surface | M13 |
|---|---|---|---|---|---|---|
| 1/R | c | 0 | 0 | 0 | 0 | 0 |
| K | K | 0 | 0 | 0 | 0 | 0 |
| C3 | $Y^1$ | −1.69512E−01 | −6.18608E−02 | −1.41823E+00 | −7.61249E−01 | |
| C4 | $X^2$ | −3.86935E−02 | −4.99103E−02 | −8.47113E−02 | −4.47704E−02 | 4.92487E−03 |
| C6 | $Y^2$ | −4.03529E−02 | −5.28464E−02 | −5.07482E−02 | −4.55422E−02 | −9.42226E−04 |
| C8 | $X^2Y$ | −1.00451E−03 | −5.79285E−04 | 5.71827E−03 | 8.58820E−04 | −1.31985E−04 |
| C10 | $Y^3$ | −1.09957E−04 | 2.51207E−04 | 2.65770E−03 | 4.10603E−04 | −1.28789E−06 |
| C11 | $X^4$ | −1.77285E−04 | −1.41238E−04 | 1.46355E−04 | 1.41177E−05 | −6.43416E−07 |
| C13 | $X^2Y^2$ | −7.00000E−05 | −2.10522E−05 | −1.10586E−04 | 5.66530E−06 | 2.81909E−06 |
| C15 | $Y^4$ | −6.04767E−05 | −1.25003E−05 | 1.75320E−05 | 4.23759E−05 | 3.30568E−07 |
| C17 | $X^4Y$ | 1.67421E−05 | 1.34047E−05 | −1.95424E−05 | 5.91893E−07 | 3.95033E−08 |
| C19 | $X^2Y^3$ | 3.25043E−06 | 3.06217E−06 | 2.17470E−06 | 2.63498E−06 | −6.13253E−08 |
| C21 | $Y^5$ | 1.66914E−06 | −6.96227E−07 | 4.76267E−06 | −1.80650E−06 | −1.00347E−08 |
| C22 | $X^6$ | 1.05099E−06 | 7.39349E−07 | −1.29317E−07 | 7.10604E−08 | 1.38787E−10 |
| C24 | $X^4Y^2$ | −3.49140E−07 | −7.73849E−08 | 1.58588E−06 | 4.80985E−08 | −1.47142E−09 |
| C26 | $X^2Y^4$ | 1.59480E−07 | 1.79569E−07 | 2.43743E−07 | −4.98527E−08 | 8.23013E−10 |
| C28 | Y6 | −2.64180E−07 | 7.27822E−08 | −8.27566E−08 | −2.00176E−07 | −3.66830E−10 |
| C30 | $X^6Y$ | −3.71444E−08 | −1.72890E−08 | 2.46627E−08 | −1.73841E−08 | −1.10409E−11 |
| C32 | $X^4Y^3$ | −2.77908E−08 | 5.12062E−09 | −8.31639E−08 | −3.73721E−08 | 5.01052E−11 |
| C34 | $X^2Y^5$ | −7.42638E−08 | 1.23296E−08 | −8.48066E−08 | 8.77381E−09 | 2.48383E−11 |
| C36 | $Y^7$ | −9.74494E−09 | 3.36712E−09 | −4.33459E−08 | 1.19292E−08 | −1.55123E−11 |
| C37 | $X^8$ | −5.72842E−09 | −1.43250E−09 | 9.15413E−11 | −1.25677E−10 | −3.98087E−14 |
| C39 | $X^6Y^2$ | −1.10702E−08 | −2.35556E−10 | −4.58008E−09 | 3.46361E−10 | 5.39444E−13 |
| C41 | $X^4Y^4$ | −2.74898E−09 | 9.78170E−10 | 3.31156E−09 | 2.37490E−09 | −1.73556E−12 |
| C43 | $X^2Y^6$ | 9.71682E−10 | 3.53737E−10 | 1.53180E−09 | 1.01327E−09 | 1.25905E−12 |
| C45 | $Y^8$ | 8.12760E−10 | 1.26618E−10 | 6.04607E−10 | 2.92308E−10 | 4.83424E−14 |
| C47 | $X^8Y$ | 3.27470E−11 | −4.57379E−11 | 2.69203E−11 | 3.12224E−11 | 2.02220E−15 |
| C49 | $X^6Y^3$ | 1.82493E−10 | −2.60259E−11 | 1.35851E−10 | 3.37708E−11 | −1.29674E−14 |
| C51 | $X^4Y^5$ | −1.74771E−10 | −1.27887E−11 | 2.97127E−11 | −2.34320E−11 | −2.34748E−14 |
| C53 | $X^2Y^7$ | 2.13758E−10 | −7.60400E−12 | 1.44928E−10 | −1.32967E−10 | 1.68898E−14 |
| C55 | $Y^9$ | 2.53852E−11 | −2.86453E−13 | 1.17160E−10 | −2.11209E−11 | 3.86861E−15 |
| C56 | $X^{10}$ | 9.54653E−12 | 1.29998E−12 | −7.12862E−13 | −1.02074E−13 | 8.66609E−18 |
| C58 | $X^8Y^2$ | 3.84515E−11 | 5.50224E−12 | 3.81359E−12 | −8.00482E−13 | −1.50700E−16 |
| C60 | $X^6Y^4$ | 2.41327E−11 | −4.61525E−12 | −2.72293E−12 | −2.37488E−12 | 9.35100E−16 |
| C62 | $X^4Y^6$ | 1.14044E−11 | −2.86546E−12 | −1.75358E−11 | −7.57652E−13 | −5.77749E−16 |
| C64 | $X^2Y^8$ | −2.35735E−11 | −2.42798E−12 | 4.15652E−12 | 3.81855E−12 | −1.90295E−16 |
| C66 | $Y^{10}$ | −5.45205E−12 | −4.04549E−13 | −5.49528E−12 | −9.43493E−13 | 3.07353E−17 |

The free curved surface coefficients have a rotationally asymmetric shape to each optical axis 9 (a Z axis), that is, a shape defined by a component of a conic term and a component of an XY polynomial equation term. For example, when X is squared (m=2), and Y is cubed (n=3), it corresponds to a coefficient of $C_{19}$ which is j={(2+3)²+2+3×3}/2+1=19. A position of an optical axis of each free curved surface is decided depending on an amount of decentering/falling indicated by the lens data of Table 1.

The aspheric coefficients have a rotationally symmetric shape to each optical axis (a Z axis), that is, a shape defined by a component of a conic term and components of even-numbered orders of fourth- to to 20-th orders of a height h from an optical axis.

The odd-numbered order polynomial equation aspheric coefficients shown in the following table 4 have a shape obtained by adding components of even-numbered orders to aspheric surfaces of the following Table 3. Further, since the height h is a positive value, the rotationally symmetric shape is obtained.

TABLE 4

|  | L10A surface | L10B surface |
|---|---|---|
| 1/c | −14.1619 | −110.036 |
| K | 0 | 0 |
| 3-rd order | 0.000168372 | 0.000267275 |
| 4-th order | −1.76395E−04 | −8.84282E−05 |
| 6-th order | 1.55533E−08 | 4.39076E−08 |
| 8-th order | −4.66699E−09 | 5.33335E−10 |
| 10-th order | 1.96613E−11 | 2.32731E−14 |
| 12-th order | 2.74250E−13 | −4.01516E−15 |
| 14-th order | 1.18590E−15 | −6.88733E−18 |
| 16-th order | 6.92994E−19 | 4.41411E−20 |
| 18-th order | −1.12856E−20 | 2.88985E−22 |
| 20-th order | 5.01591E−22 | −5.47404E−25 |

In the projection optical system, a flange back adjustment can be performed even by moving a free curved surface lens 3 serving as a focus lens operates, but (1) a deviation occurs in an original movement range (an adjustment range) of the focus lens. Further, (2) it is desirable to correct a part error of the coaxial lens system 2 through the same coaxial lens system 2 in terms of optical performance. For these reasons, the first lens group $G_1$ of the positive refractive power of the coaxial lens system 2 is separated into two refractive power components. Specifically, in FIGS. 18A and 18B, the lenses $L_1$ to $L_5$ are separated by the lens $L_6$, and the flange back adjustment is performed by moving the lenses $L_1$ to $L_5$ on the optical axis.

Here, since an aperture diaphragm 7 is arranged between the lens $L_5$ and the lens $L_6$, signs of light beam heights of the lens $L_5$ and the lens $L_6$ are opposite to each other.

Thus, since the lens $L_5$ and the lens $L_6$ differ in operation for chromatic aberration of magnification, the abbe number of the lens $L_5$ is set to be 70 or more, but conversely, the abbe number of the lens $L_6$ is set to be 35 or less.

Next, lens configurations of the lenses $L_7$ to the lens $L_{10}$ will be described.

The lenses $L_7$ to the lens $L_{10}$ is a group of lenses having a negative refractive power in the coaxial lens system 2 and constitute the second lens group $G_2$. Thus, a base is configured with a concave lens and a convex lens.

The lens $L_7$ is an aspheric lens that is made of plastic ad has a negative refractive power and a convex surface oriented to a reduction side, the lens $L_8$ is a glass lens of a biconcave shape having a negative refractive power and a concave surface oriented to a reduction side, the lens $L_9$ is a glass lens of a biconvex shape having a positive refractive power ad a small curvature radius at an enlargement side, and the lens $L_{10}$ is an aspheric lens that is made of plastic and has a negative refractive power and a convex surface oriented to an enlargement side.

In other words, when the above-described projection optical system is applied to the projection lens 423, it is possible to magnify and project the video light output from the optical modulation unit while reducing the trapezoidal distortion even when the video light is projected in the inclined direction.

<<Transparent Screen>>

Next, the transparent screen 410 serving as a device that is installed along the inner surface in the lower side portion of the windshield 400 and projects information using light projected from the video display device 420 will be described below.

The transparent screen 410 configured with the anti-reflection film has been already described above, but another transparent screen 410' will be described below.

Figure 20A:
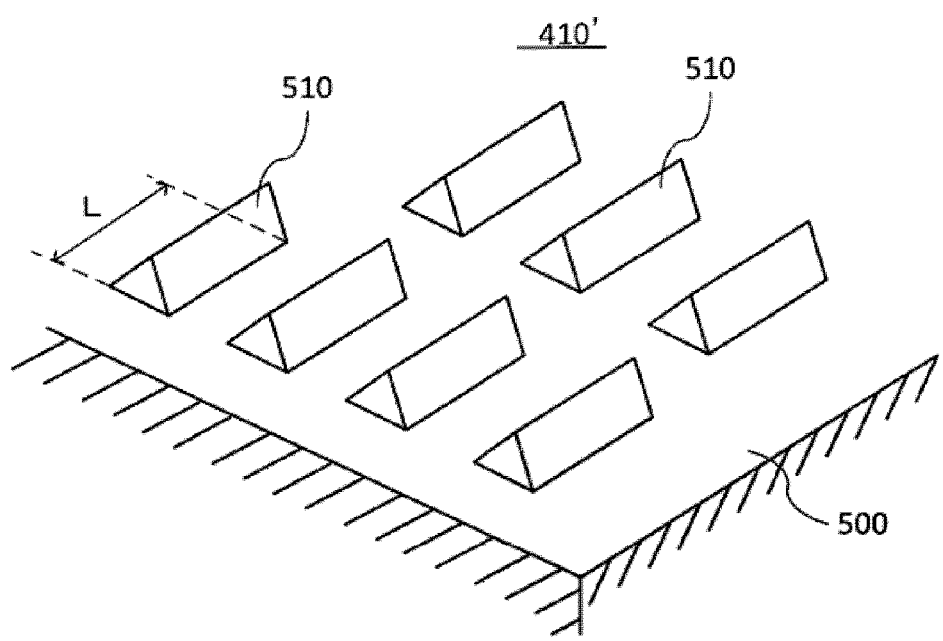
FIGS. 20A and 20B are a partially enlarged perspective view and a cross-sectional view for describing another example of a transparent screen constituting a head-up display device.
Figure 20B:
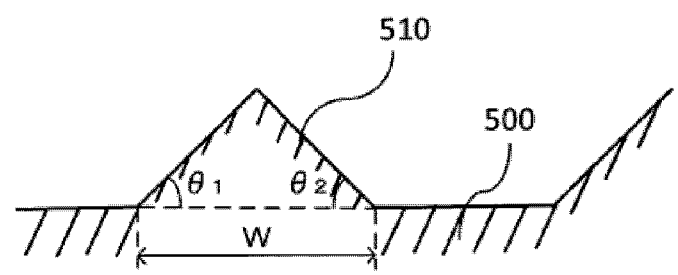

FIG. 20A is an enlarged perspective view illustrating a part of the transparent screen 410', and as illustrated in FIG. 20A, for example, a plurality of fine protrusions 510 that has a triangular cross section and a rectangular overall shape are formed on the surface of a substrate sheet 500 configured with a PET film. For example, the protrusions 510 are set to the following dimensions as illustrated in an enlarged cross section of FIG. 20B.

Vertical (L)=5 µm to 10 µm: Horizontal (W)=2 µm to 4 µm

As a cross section shape (angle) of each protrusion 510, although angles are different depending on a direction in which reflected light is guided, but in this example, for example, angles are set as follows.

Angle $(\theta_A)$=25° to 65°: angle $(\theta_B)$=65° to 25°

Figure 21A:
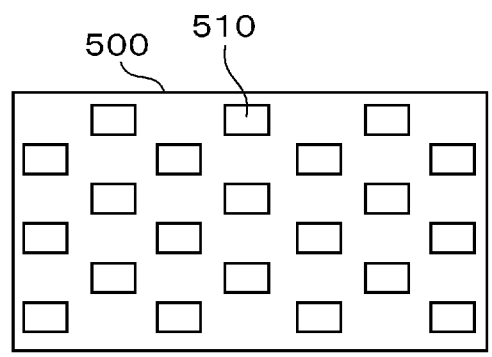
FIGS. 21A and 21B are top view for describing a configuration of a transparent screen.
Figure 21B:
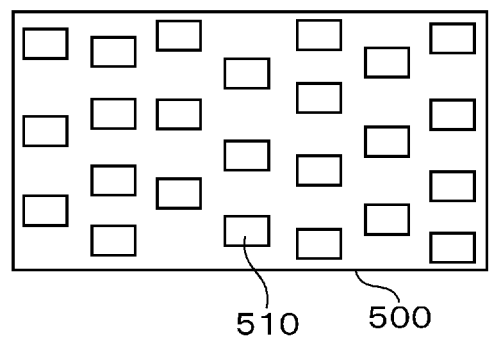

Further, the protrusion 510 is arranged and formed on the surface of the substrate sheet 500 configured with the PET film as illustrated in FIG. 21A or 21B which are front views of the screen. For example, FIG. 21A illustrates an example in which the protrusions 510 are arranged in line in the horizontal direction and the vertical direction at predetermined intervals therebetween. FIG. 21B illustrates an example in which the protrusions 510 are arranged in the horizontal direction at predetermined intervals therebetween while moving vertically.

When a plurality of protrusions 510 are distributedly arranged on the surface of the substrate sheet 500 as described above, the video light that is incident at a predetermined angle is selectively reflected in a desired direction, and thus it is possible to prevent the occurrence of moire stripe which often cause a problem in this configuration.

Figure 22:
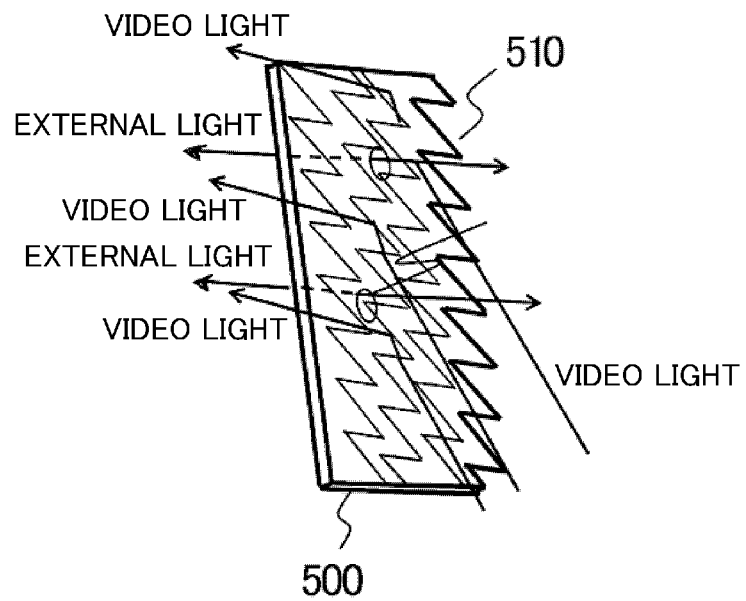
FIG. 22 is a light beam diagram illustrating a characteristic of a transparent screen.

As described above, according to the transparent screen 410' having the above-described configuration, as illustrated in FIG. 22, it is possible to reflect light that is incident upward (see FIG. 2) at a desired angle while transmitting external light and thus cause various kinds of information necessary for driving to be simultaneously displayed on the transparent screen 410' installed in the lower portion a superimposed manner together with the field of view for the outside through the windshield 400 in a state in which it is easily recognized by the eyes 409 of the driver 407.

Figure 23:
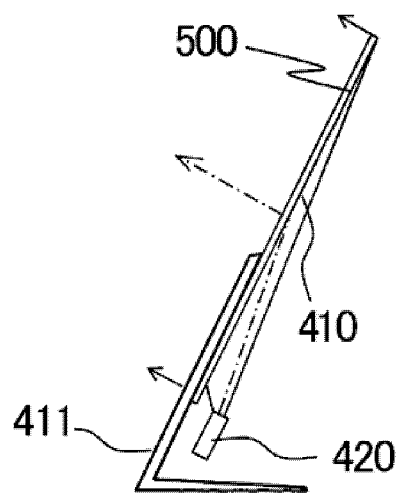
FIG. 23 is a side view illustrating an overall configuration of a head-up display device according to another embodiment of the present invention.

Finally, FIG. 23 illustrates a head-up display device according to another embodiment of the present invention. In other words, the head-up display device in which the transparent screen 410 is installed on the windshield in advance, and the video display device 420 is installed in the dashboard 403 has been described with reference to FIG. 1, but a head-up display device that can be installed on a desk or a base in a control cabin of an electric train, a training room, or the like will be here described. In other words, as illustrated in FIG. 23, for example, a transparent screen 410 serving as a display unit is inclined at a predetermined angle and held by a pair of stands 411 formed in substantially a letter "L" shape at both left and right end portions, a video display device 420 that includes a light source unit installed therein and projects video light upwards at a wide angle is arranged below the transparent screen 410, and the transparent screen 410 reflects the video light in a predetermined direction (see FIG. 1. That is, a direction in which it enters the eyes 409 of the driver 407) according to a position (height).

The present invention is not limited to the above embodiments and includes various modified examples. For example, in the above embodiment, the entire system has been described in order to facilitate understanding of the present invention, but the present invention is not limited to one necessarily having all components. Further, a component of a certain embodiment may be replaced with a component of another embodiment, and a component of a certain embodiment may be added to a component of another embodiment. Furthermore, addition, deletion, or replacement of another component may be performed on a component of each embodiment.

Further, all or some of the above-described components may be implemented by hardware, for example, may be designed by, for example, an integrated circuit (IC), or each component, each function, or the like may be implemented by software by interpreting and executing a program that implements each function through a processor. Information such as a program that implements each function, a table, or a file may be stored in a memory, a recording device such as a hard disk or a solid state drive (SSD), or a recording medium such as an IC card, an SD card, or a DVD.

REFERENCE SIGNS LIST

400 windshield
410 transparent screen
420 video display device
407 driver (operator)
409 eyes
421 light source unit
422 optical modulation unit (LC panel, reflective LC panel, DLP, and the like)
423 projection lens
424 optical direction converting unit
430 optical modulation unit driving circuit
20 light reflection synthesizing unit
30 light synthesizing unit
40 light source cell
31 dichroic prism
33 wavelength-selective optical surface (film)
35 emission surface

The invention claimed is:

1. A head-up display device that displays information including a video in a part of a field of view of an operator, comprising:
    a video display device that is arranged at a position deviated from the field of view of the operator and configured to generate and project video light for projecting the information; and
    a transparent screen that is arranged in a part of the field of view of the operator, and configured to transmit light from the field of view and reflect projection light from the video display device in a direction of the operator,
    wherein a light source of the video display device is a solid-state light source device configured to reflect and mix light emitted from a plurality of light-emitting cells and emits the light obtained by the mixing in a predetermined direction,
    the solid-state light source device includes a light guiding member,
    an outer circumference surface of the light guiding member is covered with a reflection film,
    a leading end portion of the light guiding member is a paraboloidal surface,
    an external shape of the light guiding member is a substantially pyramidal shape that has a rectangular cross section, and
    the plurality of light source cells are arranged on the outer circumference surface.

2. The head-up display device according to claim 1, wherein the solid-state light source device of the video display device is configured to emit white light, and
    the video display device includes an optical modulation unit configured to split the white light emitted from the solid-state light source device into red (R) light, green (G) light, and (blue (B) light and generate the video light, a projection optical system configured to magnify and project the video light output from the optical modulation unit, and an optical direction converting unit configured to receive the video light from the optical modulation unit through the projection optical system and project the video light toward the transparent screen.

3. The head-up display device according to claim 2, wherein the video display device further includes a second optical modulation unit in a part of the projection optical system or the optical direction converting unit.

4. The head-up display device according to claim 3, wherein the optical modulation unit of the video display device displays a video of information to be displayed in a three dimensional (3D) manner together with the second optical modulation unit.

5. The head-up display device according to claim 1, wherein the light source cells emit R light, G light, and B light sequentially and selectively,
    the video display device further includes an optical modulation unit configured to generate R light video light, G light video light, and B light video light by sequentially modulating the R light, the G light, and the B light sequentially emitted from the solid-state light source device in a cycling manner, a projection optical system configured to magnify and project the R light video light, the G light video light, and the B light video light output from the optical modulation unit, and an optical direction converting unit configured to receive the R light video light, the G light video light, and the B light video light from the optical modulation unit through the projection optical system, and project the R light video light, the G light video light, and the B light video light toward the transparent screen.

6. The head-up display device according to claim 5, wherein the emitting of the R light, the G light, and the B light from the solid-state light source device is performed with a cycle of 120 Hz to 480 Hz.

7. The head-up display device according to claim 1, wherein an anti-reflection film is formed on a surface of the transparent screen.

8. The head-up display device according to claim 1, wherein the transparent screen has a surface that includes a plurality of fine protrusions having a triangular cross section and a rectangular overall shape.

9. The head-up display device according to claim 1, wherein the transparent screen includes a plurality of fine protrusions having a triangular cross section, and the plurality of fine protrusions are formed on a surface on which the projection light from the video display device is received.

\* \* \* \* \*